UNITED STATES PATENT OFFICE.

AUGUST LEOPOLD LASKA, OF OFFENBACH-ON-THE-MAIN, GERMANY, ASSIGNOR TO CHEMISCHE FABRIK GRIESHEIM-ELEKTRON, OF FRANKFORT-ON-THE-MAIN, GERMANY, A CORPORATION.

BLACK POLYAZO DYE AND PROCESS OF MAKING SAME.

No. 832,393.          Specification of Letters Patent.          Patented Oct. 2, 1906.

Application filed March 21, 1906. Serial No. 307,273.

*To all whom it may concern:*

Be it known that I, AUGUST LEOPOLD LASKA, doctor of philosophy, chemist, and a resident of 5 Gerberstrasse, Offenbach-on-the-Main, in the Grand Duchy of Hessen, German Empire, have invented a new and useful Improvement in Black Polyazo Dyestuffs and Processes of Making the Same, of which the following is a specification.

I have found that valuable azo dyestuffs dyeing cotton black shades are obtained when the intermediate products from tetrazotized diamido bases and sulfonic acids of the 2:8 amido naphthol are further diazotized, then first combined with the amidoazo dyestuff obtained from para phenylendiamin sulfonic acid and 2:5 amidonaphthol-7-sulfonic acid having the formula:

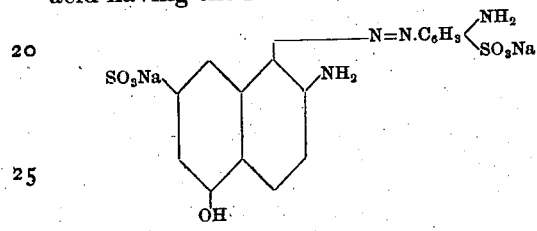

and further combined with meta diamins of the benzene series. Among the 2:8 amido naphthol sulfonic acids the 2:8 amido naphthol-6-sulfonic acid and the 2:8 amido naphthol 3:6 disulfonic acid may be used. In the general term "diamido bases" benzidin, tolidin, dianisidin, and para phenylendiamin will be regarded as included.

By carrying the manufacturing of the new dyestuffs into practical effect it is better instead of employing the dyestuff derived from para phenylendiamin sulfonic acid and 2:5 amido naphthol-7-sulfonic acid as aforesaid to use the corresponding nitroazo dyestuff of the formula:

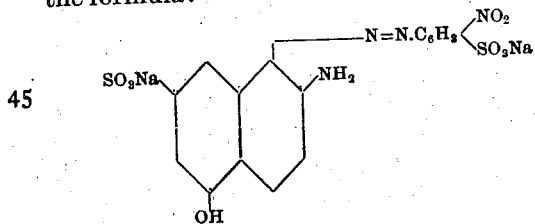

and to transform in the ready combined azo dyestuff the nitro group into the amido group by reduction in an alkaline solution.

The thus-obtained dyestuffs dye cotton deep-black shades remarkably fast to washing. They can be diazotized on the fiber and combined with phenols and amins.

The following example will illustrate the nature of my invention. The parts are by weight.

Example: Ten and six-tenths parts of tolidin are diazotized by means of twenty-eight and a half parts of hydrochloric acid (20° Baumé) and six and nine-tenths parts of sodium nitrite. This diazo compound is combined with 11.95 parts of 2:8:6 amido naphthol sulfonic acid in alkaline solution in the usual manner. When combination is ended, the whole is acidified with hydrochloric acid and further diazotation effected by means of three and a half parts of sodium nitrite. This diazo compound is allowed to run into a soda alkaline solution of the monoazo dyestuff obtained by combining 10.9 parts of para nitranilin-o-sulfonic acid and 11.95 parts of 2:5:7 amido naphthol sulfonic acid in acid solution. As soon as the intermediate product has formed a solution of 5.4 parts of meta phenylendiamin is added. In order to reduce the "nitro" group, a solution of thirty-six parts of sodium sulfid is added and the whole heated up to 50° centigrade. To complete the reaction, this temperature is maintained during two hours. The coloring-matter is precipitated by means of common salt, filtered off, and dried.

The dyestuff obtained forms a brown-black powder of metallic luster. It dissolves in concentrated sulfuric acid and water with a blue-black color. Its aqueous solution is scarcely altered by soda-lye. On addition of hydrochloric acid the dyestuff is precipitated in blue-black flakes. It dyes cotton deep-black shades.

The above example is merely typical, and I do not confine myself to its direction, as they may be varied. For instance, the meta phenylendiamin may be replaced by meta toluylendiamin, tolidin by benzidin, dianisidin, or the tetrazo compounds resulting by combining para nitranilin with sulfonic acids of the 2:8 amido naphthol, reducing the nitro group and diazotizing the resulting amido-azo dyestuff by means of two molecules of sodium nitrite.

The like dyestuffs can be obtained by employing for the combination dyestuffs containing an acetyl amido group instead of a nitro group and splitting off the "acetyl" group in the ready combined dyestuff in the known manner.

Now what I claim, and desire to secure by Letters Patent, is the following:

1. The process of making azo dyestuffs by further diazotizing the intermediate products of the tetrazo compounds of the hereinbefore-defined diamido bases and sulfonic acids of the 2:8 amido naphthol and combining with the monoazo dyestuff obtained from para nitranilin sulfonic acid and 2:5 amido naphthol-7-sulfonic acid, and combining this intermediate product with a meta diamin of the benzene series and reducing the "nitro" group in the ready combined polyazo dyestuffs thus obtained.

2. The new polyazo dyestuffs which result, when the intermediate products of the tetrazo compounds of the hereinbefore-defined diamido bases and sulfonic acids of the 2:8 amido naphthol are further diazotized, combined with the monoazo dyestuff obtained from para nitranilin sulfonic acid and 2:5 amido naphthol-7-sulfonic acid in acid solution, and further combined with a meta diamin of the benzene series, and on which, after they have been ready combined, the nitro group has been reduced; which dyestuffs form a brown-black powder of metallic luster, dye cotton black shades, and which dissolve in concentrated sulfuric acid and water with a blue-black color, from which latter solution the dyestuff is precipitated by hydrochloric acid in blue-black flakes.

3. The polyazo dyestuffs, which are produced by further diazotizing the intermediate products from tetrazo compounds of the hereinbefore-defined diamido bases and 2:8 amido naphthol-6-sulfo acid, then combining this product first with the monoazo dyestuff from para nitranilin sulfonic acid and 2:5 amido naphthol, obtained in acid solution, and further with a meta diamin of the benzene series, and reducing the "nitro" group in the ready combined polyazo dyestuffs, which dye cotton black tints and form brown-black powders of metallic luster, dissolve in concentrated sulfuric acid and water with a blue-black color, from which latter solution they are precipitated by hydrochloric acid in blue-black flakes.

In testimony that I claim the foregoing as my invention I have signed my name, in presence of two witnesses, this 8th day of March, 1906.

AUGUST LEOPOLD LASKA.

Witnesses:
 EVA SATTLER,
 GEORG LIST.